(No Model.) 2 Sheets—Sheet 1.
W. A. MORRISON & C. L. AMES.
ADJUSTABLE MIRROR.
No. 553,355. Patented Jan. 21, 1896.
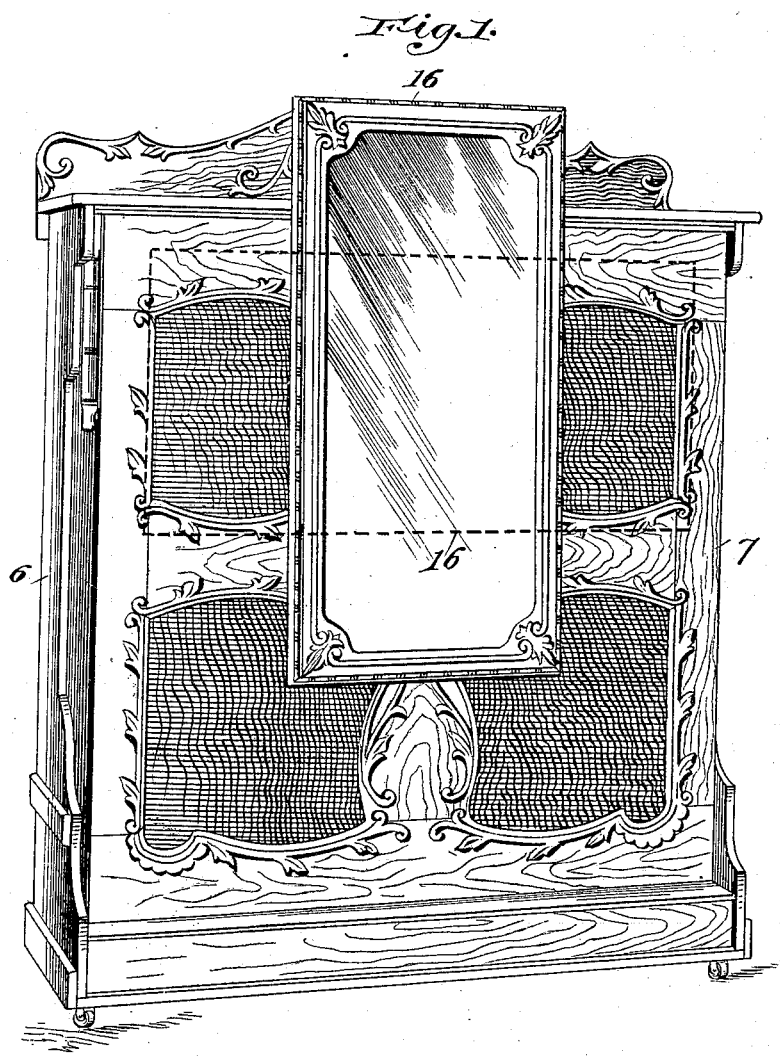

(No Model.) 2 Sheets—Sheet 2.
W. A. MORRISON & C. L. AMES.
ADJUSTABLE MIRROR.
No. 553,355. Patented Jan. 21, 1896.
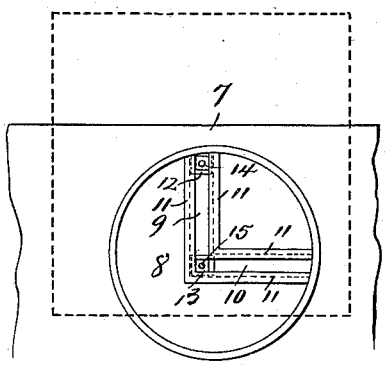
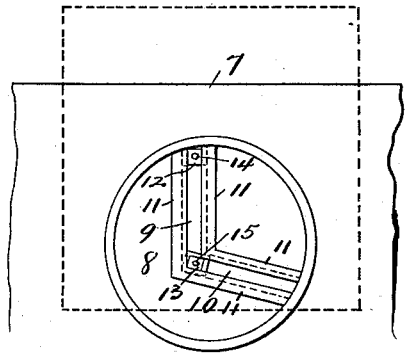
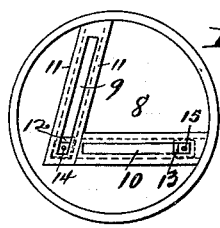
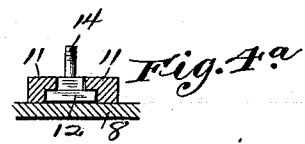
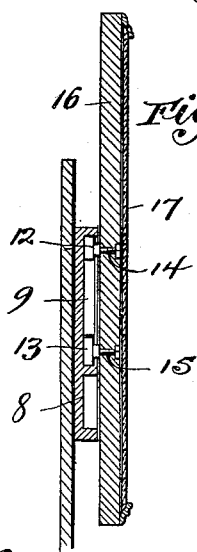
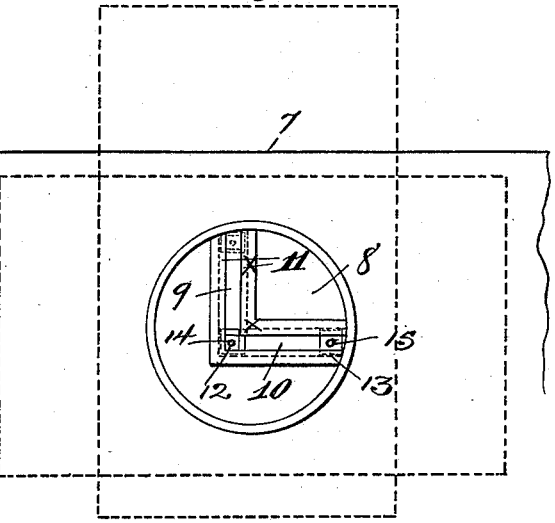
Witnesses,
J. F. Mann
Frederick F. Goodwin
Inventors,
Willard A. Morrison
Charles L. Ames
By Offield, Towle & Linthicum
Attys.

UNITED STATES PATENT OFFICE.

WILLARD A. MORRISON AND CHARLES L. AMES, OF CHICAGO, ILLINOIS, ASSIGNORS TO THE AMES & FROST COMPANY, OF SAME PLACE.

ADJUSTABLE MIRROR.

SPECIFICATION forming part of Letters Patent No. 553,355, dated January 21, 1896.

Application filed May 9, 1895. Serial No. 548,696. (No model.)

*To all whom it may concern:*

Be it known that we, WILLARD A. MORRISON and CHARLES L. AMES, of Chicago, Illinois, have invented certain new and useful Improvements in Adjustable Mirrors, of which the following is a specification.

This invention relates to means for adjustably mounting a mirror so that it may be raised or lowered for use.

Our invention is particularly adapted for adjustably mounting a mirror on the movable member of a folding bed in such manner that the mirror may be concealed and protected when the movable member of the bed is lowered and bodily elevated so as to be in convenient position for use.

Mirrors have been so mounted before our invention as to be turned into various angular positions, and mirror-frames have been centrally pivoted upon the movable member of a bed-frame so as to turn about a fixed axis. In the latter case such mirrors have been made oblong in form, so that when turned upon the pivot the upper end of the mirror projects above the bed-frame; but in this instance the mirror is not raised bodily, and its elevation when turned into a vertical position depends solely upon the fact that it is oblong.

By our invention a mirror is adapted to be so connected with a suitable base—say the movable member of a folding bed—that when the mirror is turned upon its pivot it is raised bodily and attains its elevation by reason of the fact of this lifting movement. By reason of our invention, therefore, a mirror of other form than oblong may be adjusted so as to project above the folding section of the bed when turned up and placed so as to be protected by the latter when lowered.

In carrying out our invention we preferably connect the mirror-frame with its base by means of a shifting or movable pivot, located eccentrically to the mirror-frame; or more specifically, the location of the pivot is at one side of the vertical axis and below the horizontal axis of the mirror-frame; and in order to maintain the mirror in its proper position laterally the pivot is caused to move in or upon a suitable guide or way, so that when the mirror is turned from one position to the other it not only turns upon its pivot, but said pivot likewise shifts or moves along the way provided in or secured to the base, and the mirror is thus kept in position. The mirror may be turned by hand to a position for use and its pivot moved along its way by hand manipulation, but we prefer to provide a guide whereby the pivot is constrained to move along its way when the mirror is turned.

Our invention may be embodied in a variety of structural forms, some of which we have shown in the accompanying drawings, and it may be applied to a variety of uses, one of the most useful being in connection with a folding bed, which application we have shown in the accompanying drawings, in which—

Figure 1 is a perspective view showing an oblong mirror attached to the folding member of a bed-frame, a secondary position of the mirror being indicated by the dotted lines. Fig. 2 is a broken sectional elevation taken through the mirror-frame, its base and the folding section of the bed-frame. Fig. 3 is a plan view of a base having the ways for the sliding pivots and showing the slides in said ways, two positions of the mirror being indicated by dotted lines. Fig. 4 shows a modification in the arrangement of the pivots. Fig. 4ª is a detail of one of the slides and its way. Figs. 5 and 5ª are modifications in the arrangement of the ways.

In the drawings, let 6 represent the stationary member and 7 the folding member of a bed. Upon the front of the folding member 7 is secured by preference a mirror-base 8, having grooved ways 9 10, which may be formed by cleats 11. These ways preferably intersect and are arranged at right angles to each other, as shown in Figs. 3 and 4, but the ways may be arranged obliquely with reference to each other, as shown in Fig. 5, or disconnected and one arranged in a vertical and the other in an oblique plane, as shown in Fig. 5ª. Within these ways are mounted the slides 12 13, which may be of the form shown in the detail Fig. 4ª. We prefer to employ wooden cleats for the ways and metal blocks for the slides. These blocks each carry a pin, (marked respectively 14 15,) and upon these pins, which project suitably beyond the openings of the ways, is mounted the mirror-frame 16. The pins may be in the form of headed bolts or bolts with nuts, the heads or nuts (as the case may be) being countersunk in the frame 16, so that the glass 17 may be laid flat against the frame. In this construction the pins turn freely in the slides; but they may be rigidly connected with the slides and the mirror-frame turn upon them.

The preferred manner of mounting the mirror-frame is shown in Fig. 3, wherein the pins 14 15 are eccentrically arranged with reference to the frame, the center of the latter being indicated at $x$, and the position of the pins and their slides in the two extreme positions of the mirror being indicated in Fig. 3.

Obviously, if the mirror be oblong and arranged horizontally—as, for example, as shown by the dotted lines in Fig. 1—and which will be the position when the bed is in use as a bed, the mirror may be turned to the vertical position, as shown by the full lines in Fig. 1, and in moving to this position it will carry the slides 12 13 to the extremity of their respective ways, the slide 12 attaining the upper end of the slot and the slide 13 traveling to the inner end of its slot. The mirror will turn through an arc of ninety degrees in passing from the one position to the other, and in so doing will turn freely on the pins or with them. The pin 15 constitutes the pivot and the pin 14 the guide, and the latter being eccentrically arranged, as above described, the mirror will be bodily elevated to a height bearing a relation to the distance of the pivot from the center of the mirror-frame and to the length of the ways. Therefore if a square mirror be employed, as shown in Figs. 4 and 5, such mirror will be elevated so as to bring it to a convenient height for use when the bed is closed, and our invention is therefore not dependent upon the employment of a mirror of greater length than breadth.

Where the guide is used, its slide traveling in the way constrains the pivot to move toward the vertical axis of the mirror-frame, and therefore maintains said frame in its lateral position with reference to the folding section of the bed-frame, but obviously this central position of the mirror with reference to the bed-frame might be maintained by hand manipulation, as in turning the mirror the pivot could be drawn along its slot. The guide-pin with its slide traveling in the way or groove serves as a guide and also as a stop to hold the mirror in its position, and the maintenance of this position is insured by the fact that the pivot-pin is located at one side of the vertical axis and below the horizontal axis of the mirror-frame, the supports of the latter being, when turned into a vertical position, both at one side of the vertical axis, so that gravity acts to maintain it in its upright position. This arrangement of the pivots also renders the frame more easily adjustable.

It will be seen that the eccentric connection of the mirror-frame to the bed serves to maintain the mirror in the position for use, and that the provision of the guide constrains the shifting or movement of the pivot and therefore maintains the mirror-frame in its lateral position with reference to its base.

It will be obvious that instead of the two pins with their slides and guides a single shifting pivot-pin may be employed and other means employed to shift said pin to maintain such central position. An equivalent mechanical means would be a link pivotally connected to the base and to the mirror-frame, said link being adapted to swing through the arc of a circle at its point of connection to the mirror-frame. Where the construction is as shown in Fig. 4, in which the guideway of the pivot-slide is oblique, the mirror will be elevated, as the slide and pivot move in the way, by so much as the groove is inclined. Obviously, also, the guideways might be curved instead of straight, and other variations of the structural features and arrangements of parts may be made without departing from the spirit of this invention—as, for example, the guideways might be in or on the back of the mirror-frame and the pins placed at fixed points on the bed-frame. The frame may be arranged to turn in the opposite direction from that shown.

Our invention is not limited to a folding bed, as the mirror may be used with other articles of furniture, and its base may be connected to the wall of an apartment and the mirror adjusted for the convenient use of persons of different heights.

We claim—

1. The combination with a suitable base, of a mirror frame pivotally connected thereto, said pivot being arranged eccentrically with reference to the frame whereby the latter will be raised as it is turned on the pivot, substantially as described.

2. The combination with a suitable base, of a mirror frame pivotally connected thereto, said pivot being arranged eccentrically to the mirror frame and adapted to shift laterally whereby to maintain the lateral position of the frame in adjustment, substantially as described.

3. The combination with a suitable base, of a mirror frame pivotally connected thereto, the pivot being eccentrically located with reference to the frame and adapted to be shifted laterally and a movable guide connected with the mirror frame and adapted to effect the lateral shifting of the pivot during the adjustment of the frame, substantially as described.

4. The combination with a folding bed section, of a mirror frame pivotally connected thereto, the pivot being located at one side of the vertical axis and below the horizontal axis of the mirror frame and adapted to shift laterally and a movable guide connected with the mirror frame, substantially as and for the purpose described.

5. The combination with a folding bed section, of a mirror frame pivotally connected thereto, a way in which the pivot is adapted to slide, a guide pin pivotally and eccentrically connected to the mirror frame and a way in which said guide pin is adapted to slide, said ways being arranged at an angle to each other, substantially as and for the purpose described.

6. The combination with a folding bed section, of a mirror frame, a pin pivotally and eccentrically connected to the mirror and having a slide, a way in which said slide moves, a second way arranged at an angle to the first and a guide pin pivotally connected to the mirror and having a slide adapted to said second way, substantially as described.

7. The combination with a folding bed section, of a base connected thereto and having grooved ways in its outer face arranged at an angle to each other, slide blocks located in said ways, a pivot pin and a guide pin connected to said slide blocks and a mirror frame pivotally mounted on said pins, and the pivot pin being arranged eccentrically to the mirror frame, substantially as described.

WILLARD A. MORRISON.
CHARLES L. AMES.

Witnesses:
EUGENE ANGST,
R. A. KENNEDY.